(12) United States Patent
Luo et al.

(10) Patent No.: US 9,154,910 B2
(45) Date of Patent: Oct. 6, 2015

(54) TERMINAL LOCATION OBTAINING METHOD, DEVICE, AND SYSTEM

(71) Applicant: Tencent Technology (Shenzhen) Company Limited, Shenzhen (CN)

(72) Inventors: Xuan Luo, Shenzhen (CN); Jun Yan, Shenzhen (CN); Zhou Yan, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 16 days.

(21) Appl. No.: 14/042,445

(22) Filed: Sep. 30, 2013

(65) Prior Publication Data

US 2014/0094195 A1 Apr. 3, 2014

Related U.S. Application Data

(63) Continuation of application No. PCT/CN2013/081055, filed on Aug. 8, 2013.

(30) Foreign Application Priority Data

Sep. 28, 2012 (CN) .......................... 2012 1 0370089

(51) Int. Cl.
*H04W 24/00* (2009.01)
*H04W 4/02* (2009.01)
(Continued)

(52) U.S. Cl.
CPC ............... *H04W 4/02* (2013.01); *G01S 5/0072* (2013.01); *G01S 5/02* (2013.01); *H04W 4/12* (2013.01); *H04W 4/20* (2013.01); *H04L 61/1511* (2013.01)

(58) Field of Classification Search
CPC ........... H04W 4/02; H04W 4/20; H04W 4/12; G01S 5/02; G01S 5/0072
See application file for complete search history.

(56) References Cited

U.S. PATENT DOCUMENTS 5,742,598 A 4/1998 Dunn et al.
2008/0139114 A1* 6/2008 Ranganathan .............. 455/41.1
(Continued)

FOREIGN PATENT DOCUMENTS

CN 101115302 1/2008
CN 201397389 2/2010
(Continued)

OTHER PUBLICATIONS

International Search Report and Written Opinion mailed Nov. 21, 2013, directed to International Application No. PCT/CN2013/081055; 10 pages.

(Continued)

*Primary Examiner* — Ronald Eisner
(74) *Attorney, Agent, or Firm* — Morrison & Foerster LLP

(57) ABSTRACT

This provides a terminal location obtaining method, device, and system. The method includes: a first terminal transmitting a location-obtaining request to a second terminal; the second terminal starting a positioning function to obtain the current location information of the second terminal, and transmitting the obtained location information of the second terminal to the first terminal; the first terminal using the location information of the second terminal as the location information of the first terminal, and performing a location-based application operation based on the location information. This can obtain relatively accurate location information of a terminal when the terminal is incapable of determining its own location when location determination is needed. This can also transmit the location information to a corresponding application server to avoid inaccuracy issues with determining a location based on the IP address of a terminal. This can facilitate an accurate location-based push message service.

11 Claims, 5 Drawing Sheets

(51) Int. Cl.
  *H04W 4/12* (2009.01)
  *H04W 4/20* (2009.01)
  *G01S 5/00* (2006.01)
  *G01S 5/02* (2010.01)
  *H04L 29/12* (2006.01)

(56) References Cited

U.S. PATENT DOCUMENTS

| | | | | |
|---|---|---|---|---|
| 2010/0100723 | A1* | 4/2010 | Yang et al. | 713/150 |
| 2012/0102165 | A1* | 4/2012 | Gruen et al. | 709/222 |
| 2013/0072170 | A1* | 3/2013 | Hong et al. | 455/414.1 |
| 2014/0082703 | A1* | 3/2014 | Zhang | 726/4 |
| 2014/0094195 | A1* | 4/2014 | Luo et al. | 455/456.3 |
| 2014/0357198 | A1* | 12/2014 | Ye et al. | 455/73 |
| 2014/0357269 | A1* | 12/2014 | Zhou et al. | 455/434 |
| 2014/0358994 | A1* | 12/2014 | Liu | 709/203 |
| 2014/0359038 | A1* | 12/2014 | Wen et al. | 709/206 |
| 2014/0359078 | A1* | 12/2014 | Liu | 709/219 |
| 2014/0372422 | A1* | 12/2014 | Zhang et al. | 707/724 |

FOREIGN PATENT DOCUMENTS

| | | |
|---|---|---|
| CN | 102137329 | 7/2011 |
| CN | 102325300 | 1/2012 |
| CN | 102695121 | 9/2012 |

OTHER PUBLICATIONS

Office Action dated Aug. 1, 2014, directed to CN Application No. 201210370089.1; 9 pages.

Office Action dated Nov. 15, 2014, directed to CN Application No. 201210370089.1; 9 pages.

* cited by examiner

TERMINAL LOCATION OBTAINING METHOD, DEVICE, AND SYSTEM

CROSS REFERENCE TO RELATED APPLICATION

This application is a U.S. continuation application under 35 U.S.C. §111(a) claiming priority under 35 U.S.C. §§120 and 365(c) to International Application No. PCT/CN2013/081055 filed Aug. 8, 2013, which claims the priority benefit of Chinese Patent Application No. 201210370089.1, filed on Sep. 28, 2012, the contents of both the PCT application and Chinese application are incorporated by reference herein in their entirety for all purposes.

FIELD

This disclosure relates to the computer technology field, and in particular, to a terminal location obtaining method, related device, and system.

BACKGROUND

With existing technologies, to obtain the location information of a terminal (e.g., a personal computer (PC)) with no or low-accuracy positioning capability, typically, the assigned IP address of the terminal, when connected to a network, is used to determine the location of the terminal.

However, the current IP repository defines multiple IP addresses in a relatively large area. In other words, the location of the terminal as determined by a corresponding server based on a particular IP address is a relatively large area. As a result, the locations that can be determined for these types of terminals with no or relatively low-accuracy positioning capability are not accurate enough, which can affect certain location-based application operations.

SUMMARY

Embodiments of the disclosure provide a terminal location obtaining method, related device and system, which can provide assisted positioning for terminals with no or low-accuracy positioning function to obtain relatively accurate location information of such terminals.

One embodiment of the disclosure provides a terminal location obtaining method including the following.

A first terminal transmitting a location-obtaining request to a second terminal.

The second terminal starting a location-determining function to obtain current location information of the second terminal in response to the location-obtaining request, and transmitting the obtained location information of the second terminal to the first terminal.

And the first terminal using the location information of the second terminal as location information of the first terminal, and performing a location-based application operation in accordance with the location information of the first terminal.

Accordingly, another embodiment of the disclosure provides a terminal location obtaining method performed by a first terminal, including the following steps.

Transmitting a location-obtaining request to a second terminal so that the second terminal can obtain current location information of the second terminal in response to the location-obtaining request, and return the obtained location information of the second terminal.

Receiving the location information of the second terminal and using the location information of the second terminal as location information of the first terminal.

And performing a location-based application operation in accordance with the location information.

Accordingly, another embodiment of the disclosure provides a terminal location determining method, including the following steps.

When receiving a location-obtaining request made by a first terminal, starting a positioning application to obtain current location information of the second terminal.

And transmitting the current location information of the second terminal to the first terminal so that the first terminal can use the location information of the second terminal as the location information of the first terminal and perform a location-based application operation based on the location terminal of the first terminal.

Accordingly, another embodiment of the disclosure provides a terminal location obtaining device, including the following modules.

A transmitting module that transmits a location-obtaining request to a second terminal so that the second terminal can obtain current location information of the second terminal in response to the location-obtaining request and return the obtained location information of the second terminal.

A receiving module that receives the location information of the second terminal.

And a processing module that uses the location information of the second terminal as the location information of the first terminal and performs a location-based application operation based on the location information of the first terminal.

Accordingly, another embodiment of the disclosure provides a terminal location obtaining device, including the following modules.

A positioning module that, when receiving a location-obtaining request from a first terminal, starts a positioning function to obtain current location information of the second terminal.

And a feedback module that transmits the obtained current location information of the second terminal to the first terminal so that the first terminal can use the current location information as the location information of the first terminal and perform a location-based application operation in accordance with the location information of the first terminal.

Accordingly, another embodiment of the disclosure provides a terminal location obtaining system including a first terminal and a second terminal.

The first terminal transmits a location-obtaining request to a second terminal.

The second terminal starts a location-determining function to obtain current location information of the second terminal in response to the location-obtaining request, and transmits the obtained location information of the second terminal to the first terminal.

And the first terminal uses the location information of the second terminal as location information of the first terminal, and performs a location-based application operation in accordance with the location information of the first terminal.

Accordingly, another embodiment of the disclosure provides a messaging server in communication with a first messaging terminal and a second messaging terminal. The messaging server can include: an account log-in module that determines whether the first messaging terminal and the second messaging terminal are logged into a common user account, a request-receiving module that receives a location-obtaining request from the first messaging terminal, a location information obtaining module that receives location information uploaded from the second messaging terminal, and a location information forwarding module that, if both the first messaging terminal and the second messaging terminal are logged into the common user account, forwards the received location information to the first messaging terminal.

The present disclosure can assist terminals with no or low-accuracy positioning capability to obtain relatively accurate location information and reporting the location information to a corresponding application server when location determination is required. This can avoid inaccuracy issues when determining a location based on the IP address of a terminal and thus providing an advantage for facilitating a service of an accurate location-based push message service.

DETAILED DESCRIPTION

Figure 1:
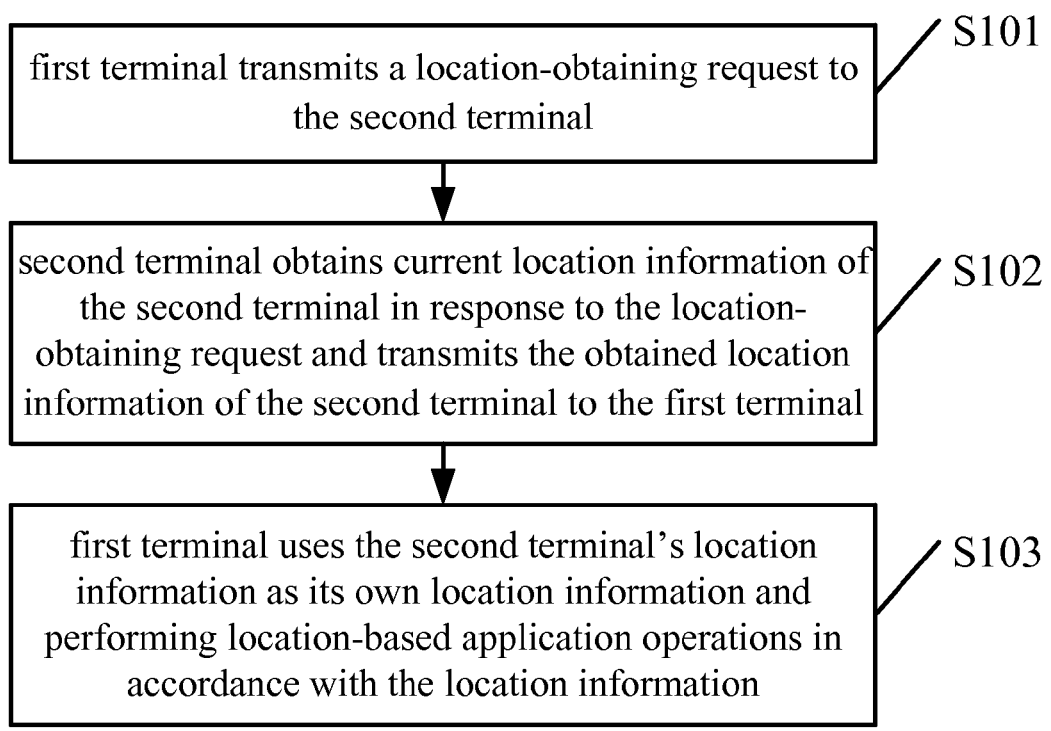
FIG. 1 is a flowchart illustrating the exemplary steps of a terminal location obtaining method, according to an embodiment of the disclosure.

A detailed description of the technical solutions of the embodiments of the present disclosure is provided below in view of the accompanying drawings. It should be understood that the embodiments described below are representative embodiments of the present disclosure rather than a complete disclosure of the every possible embodiment. The present disclosure can also include any other embodiments that can be derived from these disclosed embodiments by a person with ordinary skill in the art without any additional inventive work. It is to be understood that other embodiments can be used and structural changes can be made without departing from the scope of the embodiments of this disclosure.

This disclosure generally relates to a method and system for providing relatively accurate location information of a terminal that is incapable of obtaining its own location or is only capable of obtaining inaccurate location on its own. As referred hereinafter, a terminal or device can be any electronic device capable of connecting to a network through a wireless or wired network for transmitting and/or receiving data. Such terminal or device can include, but are not limited to, PCs, Macs, desktop computers, laptop computers, tablet PCs, smartphones including IPHONE™, ANDRIOD™ phones, WINDOWS™ phones, and BLACKBERRIES™, e-readers, in-car communication devices, televisions, gaming consoles and other consumer electronic devices with sufficient network capabilities.

Furthermore, the terms "terminal" and "device" can be interchangeable terminologies. For example, a terminal incapable of obtaining an accurate (or any) location information on its own can be, for example, a desktop computer such as a PC. A terminal capable of determining its own location relatively accurately can be, for example, a smartphone such as an IPHONE™. In the embodiments discussed below, a terminal incapable of obtaining its own location or only capable of obtaining an inaccurate location can be referred to as a "first terminal." A terminal capable of obtaining its own location relatively accurately can be referred to as a "second terminal." In some embodiments, the first terminal and the second terminal can be in a close vicinity of each other. For example, the second terminal (e.g., a smartphone) can be right next to the first terminal (e.g., a PC). The first terminal can send a request for location information to the second terminal. The second terminal, in response to the request, can obtain its own location using, for example, a built-in GPS function or base-station positioning function. These positioning mechanisms are available in many of the existing electronic devices. Depending on the terminal, the positioning system can include a combination of hardware and software to accurately determining the location of the terminal.

The second terminal can then send its own location information to the first terminal. The location information can include, for example, GPS coordinates. The first terminal can use the location information of the second terminal as its own location for the purpose of, for example, providing location data to one or more applications running on the first terminal that require such data. The one of more applications can include, for example, a social network application, search engine, map application, etc. The location information can be used for locating friends, restaurants, hotels, and receiving other location-based services such as traffic information.

The first terminal and the second terminal can communicate with each other using any suitable communication protocols or mechanisms. Because the two terminals can be relatively close to each other, short distance communication mechanisms such as BLUETOOTH™ and Infrared signals can be used to transmit information such as a request for location information and the actual location information between the two terminals. Alternatively, the two terminals can be connected to the same LAN and communicate over the LAN. The communications between the terminals can be over a wireless connection (e.g., a WIFI™ connection) or a wired connection. The first terminal can locate the second terminal by, for example, obtaining communication address information associated with the second terminal from an mDNS server. Although mDNS server and the corresponding protocol are used in some of the embodiments discussed below, it should be understood that other similar server/protocol can be used to achieve the same result, namely, providing host name resolution service to enable communication between terminals. The communication address information can include, for example, an IP address of the second terminal.

In other embodiments, the first terminal and the second terminal can communicate with each other by using a common account. For example, both terminals can have installed on them an instant messaging application (or any other network-based application) that requires a user account to access. When the user logs into his account at the second terminal (e.g., his smartphone), the smartphone can upload its location information (e.g., GPS coordinates) to a messaging server hosting the instant messaging application. When the user logs into the same account at the first terminal (e.g., his PC), a request for location information can be sent from the first terminal to the server using the instant messaging application. In response, the GPS coordinates can be downloaded from the server to the first terminal and used by the PC as its location.

Both terminals can be logged into the same account at the same time. This process of transmitting and receiving location information between the terminals can initiate in response to a user input (e.g., the user clicking on an option in the instant messaging application) or automatically when the server detects that the two terminals have both logged into the account. This allows location information from the second terminal to be transmitted to the first terminal without requiring the two terminals to be connected directly to each other or via the same physical network. In some embodiments, the location information uploaded from the second terminal (e.g., a smartphone) can be downloaded to multiple other terminals (e.g., both the user's PC and his laptop) so long as the user has logged into the same account at all these terminals. In other embodiments, the same method can work even if the terminals are logged into different user accounts. For example, the different accounts can be associated with each other (e.g., the accounts are indicated as friends with each other in the database for the messaging application). This allows location information from one user's smartphone to be used by another user's PC if their accounts are associated with each other.

FIG. 1 is a flowchart illustrating the exemplary steps of a terminal location obtaining method, according to an embodiment of the disclosure. In this embodiment, the first terminal can be a terminal such as a PC that is incapable of accurately determining its own location. Alternatively, the first terminal can be a terminal only capable of obtaining its location with relatively low accuracy based on its IP address. The second terminal can be a terminal capable of accurately determining its own location by using, for example, GPS positioning or base station positioning. In particular, the method in this embodiment can include the following exemplary steps.

S101: the first terminal transmitting a location-obtaining request to the second terminal.

When a user at the first terminal is running a type of application that requires determining the location of the terminal, the user can transmit a location determination request from the first terminal to the second terminal, which is capable of determining its location. It should be understood that, to obtain relatively accurate location information, the first terminal and the second terminal can be neighboring terminals. The first terminal can establish a communication connection with the second terminal using short distance communication mechanisms such as BLUETOOTH™, infrared, and communication over a LAN.

S102: the second terminal obtaining the current location information of the second terminal in response to the location-obtaining request and transmitting the obtained location information of the second terminal to the first terminal.

After receiving the location-obtaining request, the second terminal can start its GPS positioning or base station positioning function to determine its current location information such as a location coordinate. The second terminal can also transmit the location information to the first terminal.

S103: the first terminal using the second terminal's location information as its own location information and performing location-based application operations in accordance with the location information.

After receiving the second terminal's location information, the first terminal can use the location information as its own location information. The first terminal can transmit an ID and the location information of the first terminal to an application server. The application server can perform a corresponding push message function after receiving the ID and location information of the first terminal. For example, the application server can push the locations of nearby friends to the first terminal. Alternatively, the application server, in combination with a system clock, can push to the first terminal restaurants and hotels in its vicinity. The first terminal can also display the location information on an electronic map of the terminal to be viewed and used by the user.

The present disclosure can assist terminals with no or low-accuracy positioning capability to determine their locations, thereby obtaining relatively accurate location information of these types of terminals and performing corresponding location-based application operations. This can avoid inaccuracy issues when determining location based on the terminals' IP addresses and facilitate applications such as message push services based on accurate location information.

Figure 2:
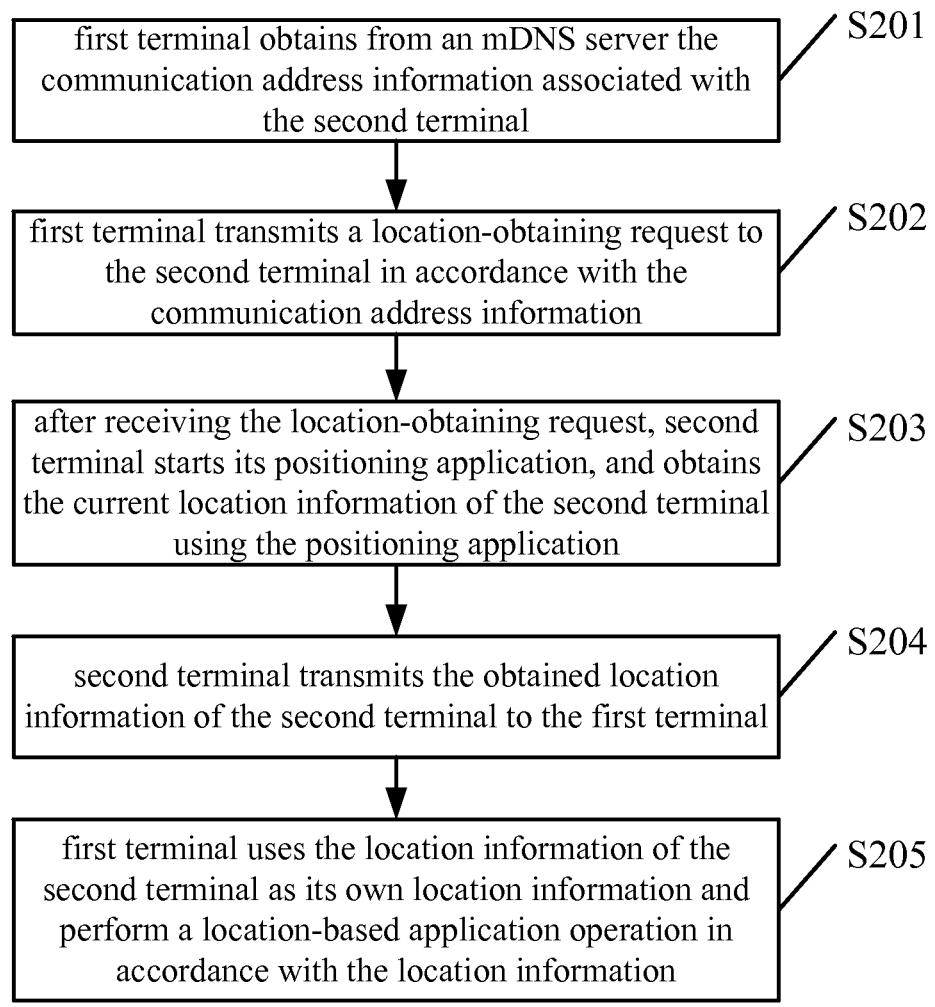
FIG. 2 is a flowchart illustrating the exemplary steps in a terminal location obtaining method, according to an embodiment of the disclosure.

FIG. 2 is a flowchart illustrating the exemplary steps in a terminal location obtaining method, according to an embodiment of the disclosure. In this embodiment, the first terminal can transmit, by communicating over a LAN, a location-obtaining request to the second terminal to obtain location information of a first terminal. In this embodiment, the first terminal can be a terminal such as a PC that is not capable of determining its own location or can only obtain a location with relatively low accuracy based on its IP address. The second terminal can be a terminal capable of accurately determining its location. In particular, the method of this embodiment can include the following exemplary steps.

S201: the first terminal obtaining from an mDNS server the communication address information associated with the second terminal. The mDNS server can store at least the domain name and corresponding address information associated with the second terminal.

S202: the first terminal transmitting a location-obtaining request to the second terminal in accordance with the communication address information.

In S201, the domain name of the second terminal stored in the mDNS server can be ID information, such as a user ID and/or device model associated with the second terminal. The first terminal can transmit the domain name of the second terminal to the mDNS server, which can resolve the domain name to obtain communication address information, such as an IP address, associated with the second terminal. The mDNS server can transmit the communication address information associated with the second terminal to the first terminal so that the first terminal can communicate with the second terminal via a corresponding router on the LAN.

In S202, the first terminal can transmit a location-obtaining request using the mDNS protocol. The mDNS protocol can be primarily for allowing the computers on the LAN to discover and communicate with each other, when there is no conventional DNS server available.

In particular, prior to S201, the method can include: the first terminal starting a desktop application; and when detecting that a function for obtaining location information of the second terminal in a setting of the desktop application has been switched on, the first terminal performing transmitting the location-obtaining request to the second terminal, e.g., he first terminal obtaining the communication address information associated with the second terminal from the mDNS server. In other words, after the user starts a desktop application and chooses to start the location information obtaining function, the first terminal can perform the step of transmitting a location-obtaining request to the second terminal (e.g., steps S201 and S202). The desktop application can be an example of one particular type of application in this embodiment. Other embodiments can include, for example, a social networking application.

S203: after receiving the location-obtaining request, the second terminal starting its positioning application, and obtaining the current location information of the second terminal using the positioning application. The positioning application can include either a GPS application or a base station location determining application.

S204: the second terminal transmitting the obtained location information of the second terminal to the first terminal. Similarly, the second terminal can transmit the location information of the second terminal to the first terminal over the LAN using the mDNS protocol.

S205: the first terminal can use the location information of the second terminal as its own location information and perform a location-based application operation in accordance with the location information.

The location information can be transmitted to a desktop application server so that the desktop application server can push corresponding service information such as friends' location information and location information of restaurants and hotels.

The present disclosure can assist terminals with no or low-accuracy positioning capability to determine their locations, thereby obtaining relatively accurate location information of these types of terminals and performing corresponding location-based application operations. This can avoid inaccuracy issues when determining location based on the terminals' IP addresses and facilitate applications such as message push services based on accurate location information.

Figure 3:
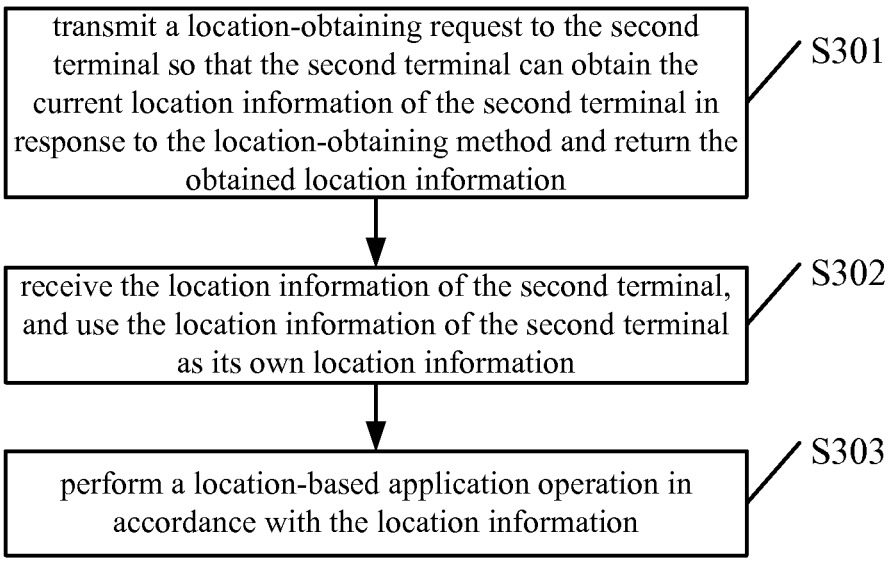
FIG. 3 is a flowchart illustrating the exemplary steps of a terminal location determining method, according to an embodiment of the disclosure.

FIG. 3 is a flowchart illustrating the exemplary steps of a terminal location determining method, according to an embodiment of the disclosure. This embodiment of the disclosure describes the method from the perspective of the first terminal, which has no or relatively low accuracy positioning capability. The method of this embodiment can include the following exemplary steps.

S301: transmitting a location-obtaining request to the second terminal so that the second terminal can obtain the current location information of the second terminal in response to the location-obtaining method and return the obtained location information.

When a user of a terminal (e.g., a PC) with no or relatively low accuracy location determining capability needs to use an application that requires the terminal's location, a location-obtaining request can be transmitted to the second terminal in S301. It should be understood that, to obtain relatively accurate location information, the first terminal and the second terminal can be neighboring terminals. The first terminal can establish a communication connection with the second terminal using short distance communication mechanisms such as BLUETOOTH™, infrared, and communication over a LAN and transmit the location-obtaining request to the second terminal.

Transmitting the location-obtaining request to the second terminal via communication over a LAN can include:

Obtaining communication address information associated with the second terminal from an mDNS server.

Transmitting the location-obtaining request to the second terminal in accordance with the communication address information.

The domain name of the second terminal in the mDNS server can be identification information such as a user ID or device model associated with the second terminal. In particular, by transmitting the domain name of the second terminal to the mDNS server, the domain name can be resolved by the mDNS server and corresponding communication address information such as the IP address of the second terminal can be obtained. The communication address information associated with the second terminal can be transmitted to the first terminal so that the first terminal can communicate with the second terminal via a corresponding router.

Then, the location-obtaining request can be transmitted using mDNS protocol. The mDNS protocol can be primarily for allowing the computers on the LAN to discover and communicate with each other, when there is no conventional DNS server available.

Prior to S301, the method can also include: starting a desktop application; and when detecting that a function for obtaining location information of the second terminal in a setting of the desktop application has been switched on, transmitting the location-obtaining request to the second terminal. It should be understood that the desktop application can be an example of one particular type of application in this embodiment. Other embodiments can include, for example, a social networking application.

After receiving the location-obtaining request, the second terminal can start its GPS function or base station positioning function to determine its current location information such as a location coordinate, and transmit the location information to the first terminal.

S302: receiving the location information of the second terminal, and using the location information of the second terminal as its own location information. If communicating over a LAN, the second terminal can transmit the location information of the second terminal to the first terminal using the mDNS protocol.

S303: performing a location-based application operation in accordance with the location information.

In particular, this step can include: transmitting the ID of the first terminal and the location information to an application server so that the corresponding application server can push to the first terminal, for example, friends' location information and service information such as restaurant, hotel, and store discount information.

The present disclosure can assist terminals with no or low-accuracy positioning capability to determine their locations, thereby obtaining relatively accurate location information of these types of terminals and performing corresponding location-based application operations. This can avoid inaccuracy issues when determining location based on the terminals' IP addresses and facilitate applications such as message push services based on accurate location information.

Figure 4:
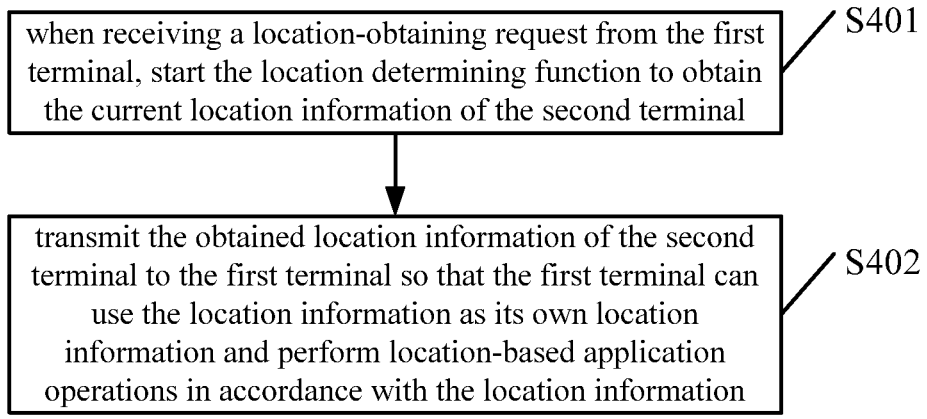
FIG. 4 is a flowchart illustrating the exemplary steps of a terminal location obtaining method, according to an embodiment of the disclosure.

FIG. 4 is a flowchart illustrating the exemplary steps of a terminal location obtaining method, according to an embodiment of the disclosure. This embodiment discloses the method from the perspective of the terminal capable of determining its location (e.g. the second terminal). The method can include the following exemplary steps.

S401: when receiving a location-obtaining request from the first terminal, starting the location determining function to obtain the current location information of the second terminal.

Starting a GPS application or a base station positioning application can obtain the location information of the second terminal. The location information can be transmitted to the first terminal via, for example, BLUETOOTH™, infrared, or communication over a LAN by using the mDNS protocol.

S402: transmitting the obtained location information of the second terminal to the first terminal so that the first terminal can use the location information as its own location information and perform location-based application operations in accordance with the location information.

In particular, the first terminal can transmit the received location information and its ID to a corresponding application server so that the application server can push to the first terminal friends' locations and restaurant, hotel, or other types of service information. The first terminal can also display for the user a mark of the location information on an electronic map at the first terminal.

The present disclosure can assist terminals with no or low-accuracy positioning capability to determine their locations, thereby obtaining relatively accurate location information of these types of terminals and performing corresponding location-based application operations. This can avoid inaccuracy issues when determining location based on the terminals' IP addresses and facilitate applications such as message push services based on accurate location information.

Provided below is a detailed description of the system and related devices in other embodiments of the disclosure.

Figure 5:
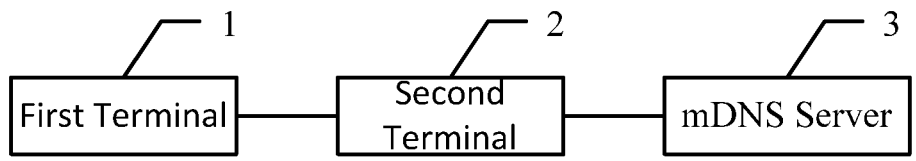
FIG. 5 is a block diagram illustrating the exemplary structure of a terminal location obtaining system, according to an embodiment of the disclosure.

FIG. 5 is a block diagram illustrating the exemplary structure of a terminal location obtaining system, according to an embodiment of the disclosure. The system of this embodiment can include a first terminal 1 and a second terminal 2, wherein the first terminal 1 can be a terminal (e.g., a PC) with no or relatively low accuracy location determining capability and the second terminal 2 can be a terminal (e.g., a mobile phone) having a GPS or another positioning application capable of providing accurate location determination.

The first terminal 1 can obtain the location information of the nearby second terminal 2 and use it as its own location information for performing corresponding positioning application. For example, a user of the first terminal 1, such as a PC, can obtain location information of the second terminal 2, such as his mobile phone, as the location information of the first terminal 1. In particular:

The first terminal 1 can transmit a location-determining request to the second terminal 2.

When the user of the first terminal 1 is using a certain type of applications that need to determine the first terminal's position and report it to an application server, the user can transmit a location information obtaining request from the first terminal 1 to the second terminal 2. The first terminal 1 can transmit the location obtaining request to the second terminal 2 using short distance communication mechanisms such as BLUETOOTH™™, infrared, and communicating over a LAN.

The second terminal 2 can start a positioning function to obtain the current location information associated with the second terminal 2 in response to the location determination request and transmit the obtained location information of the second terminal 2 to the first terminal 1.

In particular, after receiving the location-obtaining request, the second terminal 2 can start a positioning application and obtain the current location information associated with the second terminal 2 using the positioning application.

The positioning application can include a GPS application or base station positioning application. The obtained location information of the second terminal 2 can be transmitted to the first terminal 1.

The first terminal 1 can also use the location information of the second terminal 2 as the location information of the first terminal 1 and perform a location-based application operation in accordance with the location information.

After receiving the location information of the second terminal 2, the first terminal 1 can directly use this location information as the location information of the first terminal. The first terminal 1 can transmit an ID of the first terminal and the location information to an application server. After receiving the ID and location information of the first terminal 1, the application server can perform a corresponding push message function. For example, the application server can push nearby friends' location to the first terminal. Alternatively, the application server, in combination with a system clock, can push to the first terminal information about restaurants and hotels in its vicinity. The first terminal can also display a mark of the location information on an electronic map of the terminal to be viewed and used by the user.

Optionally, when the first terminal 1 and the second terminal 2 carry out corresponding data transfers by communicating over a LAN, the system can also include: an mDNS server 3. The mDNS server 3 can store at least the domain name of the second terminal 2 and its corresponding communication address information.

In particular, the first terminal 1 can obtain the communication address information of the second terminal 2 from the mDNS server 3 and transmit a location-obtaining request to the second terminal 2 in accordance with the communication address information.

The first terminal 1 can transmit the domain name of the second terminal to the mDNS server 3, which can resolve the domain name and obtain the communication address information corresponding to the IP address of the second terminal 2. The communication address information of the second terminal can be transmitted to the first terminal 1 so that the first terminal 1 can communication with the second terminal 2 via a corresponding router. The first terminal 1 can transmit a location obtaining request using the mDNS protocol. The mDNS protocol can be primarily for allowing the computers on the LAN to discover and communicate with each other, when there is no conventional DNS server available.

Optionally, the function of the first terminal 1 obtaining location information of the second terminal 2 from the second terminal 2 and using it as its own location information can be built in different types of applications including, for example, a desktop application and social networking application. When it is to desktop application, the first terminal 1 can also start the desktop application. When detecting that a function for obtaining location information of the second terminal in a setting of the desktop application has been switched on, the first terminal can transmit the location-obtaining request to the second terminal 2. That is, the first terminal can obtain the communication address information of the second terminal 2 from the mDNS server 3 and transmit the location-obtaining request in accordance with the communication address information.

Figure 6:
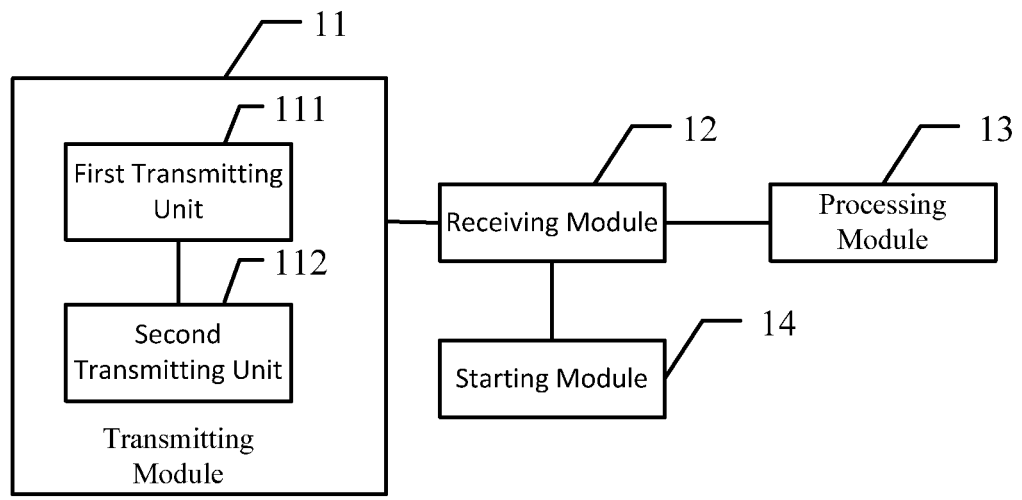
FIG. 6 is a block diagram illustrating the exemplary structure of a terminal location obtaining device, according to an embodiment of the disclosure.

In particular, FIG. 6 is a block diagram illustrating the exemplary structure of a terminal location obtaining device, according to an embodiment of the disclosure. The device of this embodiment can be devices that have no or relatively low accuracy location determining capability. The device can be a part of the first terminal 1 of the previous embodiments. In this embodiment, the device can include the following exemplary modules.

A transmitting module 11 that can transmit a location-obtaining request to the second terminal so that the second terminal can obtain the current location information of the second terminal in response to the location-obtaining request and return the obtained location information of the second terminal.

A receiving module 12 that can receive the location information of the second terminal.

A processing module 13 that can use the location information of the second terminal as the location information of the first terminal and perform a location-based application operation in accordance with the location information.

The second terminal can be the second terminal of the previous embodiments, capable of determining its own location. When a user of the first terminal including the device of this embodiment uses a certain type of application that needs to determine the location of the terminal, the user can transmit via the transmitting module 11 a location-obtaining request to a second terminal with positioning capability. The transmitting module 11 can transmit the location-obtaining request to the second terminal using short distance communication mechanisms such as BLUETOOTH™, infrared, and communication over a LAN.

After receiving the location-obtaining request, the second terminal can start its GPS function or base station positioning function to determine its current location information such as a location coordinate and return the obtained location information to the first terminal.

In particular, if the location-obtaining request is transmitted over a LAN, the transmitting module 11 can include, for example, a first transmitting unit 111 that can confirm the communication address information of the second terminal with a mDNS server; a second transmitting unit 112, that can transmit the location-obtaining request to the second terminal in accordance with the communication address information.

The domain name of the second terminal in the mDNS server can be identification information such as a user ID or device model associated with the second terminal. The first transmitting unit 111 can have the mDNS server resolve the domain name of the second terminal by transmitting the domain name of the second terminal to the mDNS server, obtain the corresponding communication address information such as an IP address of the second terminal, and return the communication address information associated with the second terminal so that the second transmitting unit 112 can communicate with the second terminal via a corresponding router.

The second transmitting unit 112 can use mDNS protocol to transmit the location-obtaining request. The mDNS protocol can be primarily for allowing the computers on the LAN to discover and communicate with each other, when there is no conventional DNS server available.

Optionally, the device can also include:

A starting module 14 that can start a desktop application.

The transmitting module 11 can transmit a location-obtaining request to the second terminal after detecting the function for obtaining location information of the second terminal in the setting of the desktop application has been switched on. This can include the above-described steps performed by the first transmitting unit 111 and the second transmitting unit 112.

Figure 7:
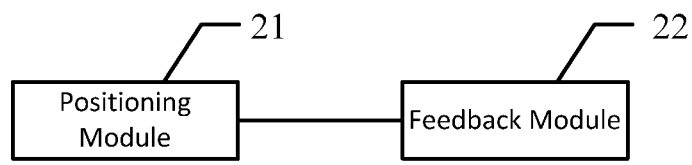
FIG. 7 is a block diagram illustrating the exemplary structure of a terminal location obtaining device, according to an embodiment of the disclosure.

In addition, FIG. 7 is a block diagram illustrating the exemplary structure of a terminal location obtaining device, according to an embodiment of the disclosure. The device of this embodiment can be a part of a terminal capable of determining its locations. For example, it can be part of the second terminal 2 in the above-described embodiments. In this embodiment, the device can include:

A positioning module 21 that can start a positioning function to obtain the current location information of the second terminal after receiving a location-obtaining request from the first terminal.

The positioning function can include, for example a GPS function or a base station positioning function.

A feedback module 22 that can transmit the obtained current location information of the second terminal to the first terminal so that the first terminal can use the location information as its own location information and perform a location-based application operation in accordance with the location information.

The feedback module 22 can establish a communication connection with the first terminal via short distance transmission mechanisms such as BLUETOOTH™ or infrared connections and return location information to the first terminal, or communicate with the first terminal in the mDNS protocol over a LAN.

The first terminal can transmit the received location information and its ID to an application server so that the application server can push to the first terminal, for example, nearby friends' locations and restaurant and hotel service information. The first terminal can also display for the user a mark of the location information on an electronic map at the first terminal.

The present disclosure can assist terminals with no or low-accuracy positioning capability to determine their locations, thereby obtaining relatively accurate location information of these types of terminals and performing corresponding location-based application operations. This can avoid inaccuracy issues when determining location based on the terminals' IP addresses and facilitate applications such as message push services based on accurate location information.

Figure 8:
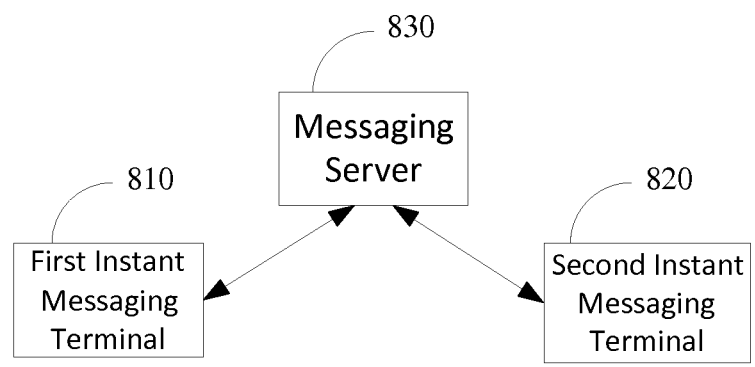
FIG. 8 is a block diagram illustrating an exemplary structure of a messaging network including multiple terminals and a server, according to an embodiment of the disclosure.
Figure 9:
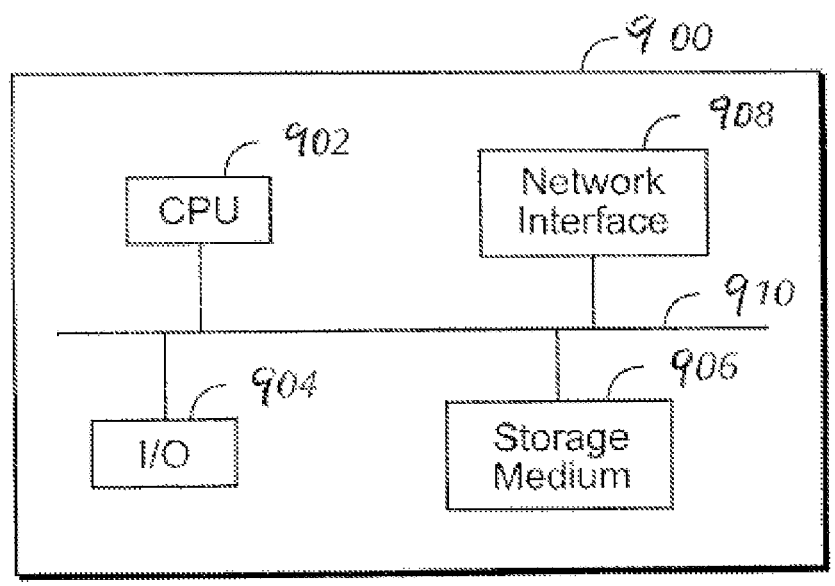
FIG. 9 illustrates exemplary common components of a computing system such as one of the terminals and devices in the various embodiments described below.

FIG. 8 is a block diagram illustrating the exemplary structure of a messaging network according to an embodiment of the disclosure. The messaging network in the illustrated embodiment can include, for example, a first instant messaging terminal 810, a second instant messaging terminal 820, and a messaging server 830. The first instant messaging terminal 810 can be a terminal incapable of accurately determining its own location. In contrast, the second instant messaging terminal 820 can be a terminal capable of accurately determining its own location. In one embodiment, the first instant messaging terminal 810 can be a user's PC and the second instant messaging terminal 820 can be the same user's smartphone. Both terminals 810, 820 can have an instant messaging application installed on them. Although the terminals are referred as instant messaging terminals, it should be understood that the terminals can be any device capable of operating an instant messaging application or any other network-based communication application. It should also be understood that the terminals do not have to be dedicated terminals for instant messaging, but can include other applications and programs.

The instant messaging application (or any other suitable communication application) at the first instant messaging terminal 810 and the second instant messaging terminal 820 can be accessed using a user account. In this embodiment, the two terminals can belong to the same user. Thus, the user can log into his user account at both of these terminals. Both terminals can be connected to a messaging server 830 via a network, such as the Internet. This can be different from the direct connections, such as BLUETOOTH™, Infrared, and LAN connections, mentioned in the embodiments above. The messaging server 830 can route instant messages between the first instant messaging terminal 810 and second instant messaging terminal 820.

In one embodiment, the first instant messaging terminal 810 can transmit a request for location information via the messaging application to the messaging server 830. The messaging server 830 can determine that the second instant messaging terminal 820 is logged into the same user account and forward the request to the second instant messaging terminal 820. In response, the second messaging terminal 820 can obtain its location information, such as its GPS coordinates, and upload it to the messaging server 830 using the messaging application. The messaging server 830 can then forward the location information to the first instant messaging terminal 810 using the messaging application. In some embodiments, the request and the location information can be transmitted in the format of an instant message.

In another embodiment, whenever the user logs into his user account at the second instant messaging terminal 820, the location information of the second instant messaging terminal 820 can be determined and automatically uploaded to the messaging server 803. Optionally, the location information can be updated on a regular basis or when it is detected that the second messaging terminal 820 has moved for a significant distance from a previous location, as long as the user is logged into the messaging application. When the messaging server 803 detects that another terminal (e.g., the first instant messaging terminal 801) has logged into the same user account, it can forward the location information uploaded from the second instant messaging terminal 802 to the other terminal so that the other terminal can use the location information as its own location information.

In one embodiment, the messaging server 803 can obtain information regarding the types of terminals currently logged into the user account. For example, the messaging server may determine the first instant messaging terminal 801 to be a PC and the second instant messaging terminal 802 to be a smartphone. This determination can be based on, for example, device IDs uploaded from the terminals or the version of the messaging application at each terminal. Based on the type of each terminal currently logged into the messaging application, the messaging server 803 can determine whether a terminal may require location information from another terminal. It can also determine whether a terminal can provide location information to be used by another terminal logged into the same account. This can allow the messaging server 803 to intelligently obtain and transmit location information from a terminal (e.g., a smartphone) capable of determining its own location to another terminal (e.g., a PC) that cannot accurately determine its location. In contrast to the embodiments discussed above, the embodiment illustrated in FIG. 8 can rely on a network-based application to share location information between two terminals.

Based on the above-described embodiments, a person skilled in the art can understand that parts of or the whole process described in each of the above embodiments can be performed by software with the necessary hardware platform or by hardware. Based on this understanding, the above-described embodiments can be implemented as a software product. The software product can be stored in a non-transitory readable medium, such as a floppy disk, CD, read-only memory (ROM), or random access memory (RAM) and include a number of instructions, which when executed, perform the processes described in these embodiments or part of these embodiments.

In some embodiments, one or more of the modules/units in FIGS. 5-7 can be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this file, a "non-transitory computer-readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The non-transitory computer readable storage medium can be part of a computing system serving as a terminal or device of one of the embodiments of the disclosure. FIG. 8 illustrates exemplary common components of one such computing system. As illustrated, the system 800 can include a central processing unit (CPU) 802, I/O components 804 including, but not limited to one or more of display, keypad, touch screen, speaker, and microphone, storage medium 806 such as the ones listed in the last paragraph, and network interface 808, all of which can be connected to each other via a system bus 810. The storage medium 806 can include the modules/units of FIGS. 5-7.

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims.

What is claimed is:

1. A terminal location obtaining method performed by a first terminal, comprising:
   starting an application on the first terminal, the application comprising a function for obtaining, in a setting of the application, location information of a second terminal;
   when detecting that said function has been switched on, transmitting, by the first terminal, a location-obtaining request to the second terminal, so that the second terminal can obtain current location information of the second terminal in response to the location-obtaining request, and return the obtained location information of the second terminal to the first terminal;
   receiving the location information of the second terminal, and using the location information of the second terminal as location information of the first terminal, and
   performing, by the first terminal, a location-based application operation in accordance with the location information.

2. The method of claim 1, wherein transmitting the location-obtaining request to the second terminal comprises:
   obtaining communication address information associated with the second terminal from a multicast Domain Name System (mDNS) server, and
   transmitting the location-obtaining request to the second terminal in accordance with the communication address information.

3. The method of claim 1,
   wherein the application comprises a desktop application.

4. The method of claim 1, wherein the first terminal comprises a PC and the second terminal comprises a mobile communication device.

5. A terminal location obtaining method performed by a second terminal, comprising:

when receiving a location-obtaining request made by a first terminal, starting a positioning application to obtain current location information of the second terminal, and transmitting the current location information of the second terminal to the first terminal so that the first terminal can use the location information of the second terminal as the location information of the first terminal and perform a location-based application operation based on the location information of the first terminal.

6. The terminal location obtaining method of claim 5, wherein the positioning application comprising either a GPS application or a base station positioning application.

7. A terminal location obtaining device of a first terminal, comprising:

a starting module that starts an application on the first terminal, the application comprising a function for obtaining, in a setting of the application, location information of a second terminal;

a transmitting module that, when the starting module detects that said function has been switched on, transmits a location-obtaining request to the second terminal, so that the second terminal can obtain current location information of the second terminal in response to the location-obtaining request, and return the obtained location information of the second terminal to the first terminal, a receiving module that receives the location information of the second terminal, and a processing module that uses the location information of the second terminal as the location information of the first terminal, and performs a location-based application operation based on the location information of the first terminal.

8. The device of claim 7, wherein the transmitting module comprises:

a first transmitting unit that obtains communication address information associated with the second terminal from a multicast Domain Name System (mDNS) server, and a second transmitting unit that transmits the location-obtaining request to the second terminal in accordance with the communication address information.

9. The device of claim 7, wherein the application comprises a desktop application.

10. A terminal location obtaining device of a second terminal, comprising:

a positioning module that, when receiving a location-obtaining request from a first terminal, starts a positioning function to obtain current location information of the second terminal, and a feedback module that transmits the obtained current location information of the second terminal to the first terminal so that the first terminal can use the current location information as the location information of the first terminal and perform a location-based application operation in accordance with the location information of the first terminal.

11. The terminal location obtaining device of claim 10, wherein the positioning application comprising either a GPS application or a base station positioning application.

* * * * *